Feb. 7, 1967 J. ALLEAUME 3,302,359
CORRUGATED SHEET-LIKE YIELDABLE WALL ELEMENT AND
VESSELS OR TANKS MADE THEREOF
Filed Aug. 3, 1965 10 Sheets-Sheet 5

Inventor
Jean ALLEAUME
By: Nolte & Nolte
ATTORNEYS

United States Patent Office 3,302,359
Patented Feb. 7, 1967

3,302,359
CORRUGATED SHEET-LIKE YIELDABLE WALL ELEMENT AND VESSELS OR TANKS MADE THEREOF
Jean Alleaume, Saint-Cloud, France, assignor to Technigaz, Paris, France, a corporation of France
Filed Aug. 3, 1965, Ser. No. 476,988
Claims priority, application France, Aug. 6, 1964, 984,429; Jan. 5, 1965, 919; Apr. 30, 1965, 15,442
16 Claims. (Cl. 52—573)

The present continuation-in-part relates essentially to improvements and modifications in the device described in the main patent application Serial No. 374,042 filed June 10, 1964, and more particularly but not exclusively to certain specific forms of embodiment of this device.

In the main patent application there is described a pleated or corrugated sheet, plate or panel element formed from sheet material such as sheet metal or the like and suitable for constructing the walls of flexible or resiliently deformable enclosures or containers, which comprise at least two series or groups of mutually secant corrugations of substantially cylindrical or polyhedral configuration, the corrugations of a same series being preferably but not exclusively substantially parallel to one another and for example but not compulsorily perpendicular to those of the other series. A third series of corrugations consists of waves formed respectively at each intersection between a wave of the first series of corrugations and a wave of the second series of corrugations across the crest of the first wave of the first series. These two series of corrugations, which are for example orthogonally secant, constitute a preferably substantially regular network of waves forming therebetween polygonal areas, these areas being for example substantially flat and notably of rectangular or square configuration in the case of intersections at right angles. Each series of corrugations consists advantageously of substantially identical corrugations or waves. All the corrugations are advantageously rectilinear and the aforesaid corrugations of said third series are concave and substantially parallel to those of the aforesaid second series.

It is one object of the present continuation-in-part to create various alternate configurations of this device, of the type wherein each wave of the first series is convex or projects from one side of the aforesaid sheet element, each wave of the second series being concave or hollow on said one side.

The device according to the present continuation-in-part is remarkable notably in that the polyhedral or prismatic surface of each wave in said corrugations is preferably substantially symmetrical in relation to a longitudinal plane substantially parallel to said wave and normal to the basic surface of the metal or other sheet constituting said element, each corrugation of the third series consisting of a single hollow wave at least geometrically similar and substantially superimposed to the associated wave of the second series to constitute a prismatic impression in said wave of the first series of which each one of the opposite side faces clearing the trough of said wave of the second series and connetcing on either side the small faces of said impression respectively to those of said wave of said second series, contsitutes a convex prismatic lateral surface of same geometrical nature which is an extension of the small faces of said impression to the faces of said wave of the second series and corresponds in shape to the contour of said last-named wave in a corresponding manner.

According to another feature characterizing this continuation-in-part, each aforesaid convex prismatic lateral surface is connected on the one hand to said impression through projecting dihedral angles and on the other hand to the lateral face of the aforesaid wave of said first series and to the small faces of the aforesaid wave of the second series through hollow angles.

According to the main patent application, the corrugations of at least one series comprise respectively at each intersection with the waves of the other series and on either side of said intersection an impression in the form of a concave transverse fold in the wave crest.

It is another object of the present invention to somewhat generalize the principle of the invention which is set forth in the main patent application and the form of embodiment complying with this object is remarkable notably in that the aforesaid wall element comprises several series or groups of corrugations aforesaid of which all the waves are substantially identical and distributed at regular angular intervals about each intersection and admitting each preferably a longitudinal plane of symmetry substantially perpendicular to the initial plane of the said metal sheet, the waves of each series or group comprising on the other hand respectively at each intersection and on either side thereof the aforesaid concave transverse folding impression in their crest and are substantially symmetrical in relation to the axis normal to said initial plane which passes through the center of said intersection.

The intersection configurations in this system of corrugations, whether it comprises only two series of mutually orthogonal waves or an arbitrarily large number greater than two, of mutually secant waves forming acute and equal angles therebetween, is advantageous in that a displacement of material in one wave direction, which may be caused for example by thermal contraction or expansion, is attended by substantially equal displacements in all the other wave directions.

Finally, in the main patent application the waves of each series or group were each preferably substantially symmetrical in relation to the longitudinal plane passing through the waves crest and perpendicular to the initial plane or basic surface of the aforesaid sheet-metal stock. Each wave had a substantially dihedral configuration or a cross-sectional contour having substantially the shape of a triangular arc. Now, cyclic pressure strength tests conducted in order to ascertain the mechanical resistance of the wave system to periodic or recurrent stress and strain and therefore determine the strain limit of the material proved that the safety margin provided by the above-described wave shapes might be inadequate under certain circumstances, or that at least said waves underwent during such tests a non-localized permanent set due to the formation of plastic hinges thus evidencing the fact that the elastic limit had been overstepped. In this respect it is interesting to note that the aforesaid strength tests were carried out at room temperature whereas in specific applications wherein for example the corrugated sheet material is to constitute a primary barrier of a tank or enclosure to be filled with liquified gas at a very low temperature, such as methane, this sheet is normally subjected to temperatures of the order of $-160°$ C. Now the strength limit or fatigue limit is considerably lower at this very low temperature than at room temperature; in other words, for a given load or stress value, the total number of permissible stress cycles at very low temperature will be considerably higher than at room temperature.

Under these conditions, it seemed advantageous, notably for the aforesaid special applications, to try to find both the optimum sampling and the optimum shape of the waves so that the stress values be at the most close to but below the elastic limit of the metal at room temperature, so as to be considerably below this limit at the very low service temperature contemplated in order safely to benefit of the increment in fatigue limit which corresponds to the service conditions contemplated. On the other hand, the theoretical study of stress-strain diagrams in the dihedral wave shape utilized up to now proved that irrespective of the values given to the geometrical parameters on which the wave is based a substantial fraction of the strain was ascribable to the fact that the wave had flat faces or sides, that is, a rectilinear-sided contour.

Still another object of the present continuation-in-part is to solve this problem by proposing an optimal wave configuration adapted to the specific conditions of operation contemplated for example in the case of tanks for the storage of natural gas or liquefied hydrocarbons installed on tankers. In this specific application a variation of about one millimeter per wave in the relative spacing of the wave sides or in the opening distance at the base of the wave is admitted for manufacturing tolerances, with a permissible pressure ranging from 1 kilogram/sq. centimeter (hydrostatic pressure in the absence of acceleration) to 2 kilogram/sq. centimeters or even more applied to the corrugated sheet (this last pressure figure constituting the total pressure with due regard for the forces of inertia). The wave form according to the present continuation-in-part is therefore remarkable notably in that each wave aforesaid comprises two side faces having respectively the form of curved or cylindrical and preferably circular surface portions.

According to another feature of this continuation-in-part the aforesaid two wave sides are connected respectively and preferably substantially tangentially by cylindrical, for example substantially circular, surface portions, on the one hand with each other and on the other hand to the basic surface of the aforesaid sheet-metal stock.

According to a further feature characterizing this continuation-in-part, each waveside aforesaid is convex or outwardly bulged, on the side of the aforesaid sheet metal where said wave projects, whereby the wave concerned has a cross-sectional contour forming an arc of a substantially ogival, curvilinear triangular or like arched configuration.

Systematic calculus effected with a computing machine made it possible to determine the variation in strain in the various cross-sections of the wave as a function of the parameters governing the contour of this wave. This calculus proved that the waveform according to the present continuation-in-part is that corresponding to the minimum strain values for the above-specified service and sampling conditions. The above-disclosed digital research made it possible to ascertain notably the influence of the various radii of curvature of the behavior of the wave wall.

Thus, the smaller the radius of curvature, the lower the strain.

The calculated strain $\sigma$ may be expressed in the form of an arithmetic sum of two terms designating respectively the contribution of thermal origin and the contribution due to pressure. The term designating the strain component of thermal origin is directly proportional to the thickness, and the term denoting the pressure strain component is inversely proportional to the square of this thickness. Therefore, in any desired section of the wave cross-sectional contour the strain may be expressed as follows:

$$\sigma = A \cdot e + \frac{B \cdot p}{e^2}$$

wherein $e$ is the thickness of the sheet-metal stock, $p$ the applied pressure, A and B digital coefficients depending on dimensional wave parameters that are constant for a wave of given shape and dimensions. The calculus of strain along the wave form shows that this strain is maximum at the base of each wave, that is, along the straight line tangentially interconnecting the fillet or side face at the base of the wave to the initial plane surface of the sheet.

The systematic search for the best shape and wave size proved that the theoretically optimum wave configuration which is independent of pressure (that is, in which the second term of the above formula, which denotes the pressure strain component, was substantially zero) was a hull-shaped or semi-cylindrical envelope (or a semi-circular contour) connected normally or at right angles to the flat base surface of the sheet-metal stock by means of a straight and sharp dihedral angle (i.e. of zero radius of curvature). With this wave form the thermal strain component denoted by the first term of the second side of the above formula has comparatively the highest value in relation to the other wave forms contemplated. As a sharp-angle folding at the base of the wave is practically impossible due to the finished thickness of the sheet-metal stock, the theoretical optimum semi-cylindrical shape with sharp angle orthogonal folding at the root or beginning of the wave should of replaced by a very similar but actually feasible shape differing only by the presence of connecting fillets at the wave base. The existence of these connecting fillets obviously reintroduces into the preceding formula the last term denoting the pressure strain component, but the strain of thermal origin decreases on the other hand to a substantial extent. However, consideration on the folding of relatively thin metal sheets and on the difficulties experienced in shaping or forming the intersection junctions of two secant waves pertaining to two different series or groups of different waves respectively, proved that the wave form having a semi-circular contour was objectionable from the point of view of its manufacture, notably on account of the crushing or flattening of the wave in the area of its intersection with another wave when forming the intersection junction. Under these conditions it was necessary to find a satisfactory compromise between manufacturing requirements and possibilities and the obtaining of optimum strain values, thus actually leading to the wave form having a curvilinear triangular contour.

Other features and advantages of the present continuation-in-part will appear as the following detailed description proceeds with reference to the accompanying drawings illustrating diagrammatically by way of example various forms of embodiment of the corrugated sheet material obtained according to the teachings of this invention. In the drawings:

FIGURE 8 is a perspective view taken from the opposite or underside of the device shown in FIGURE 5;

Referring first to the specific form of embodiment illustrated in FIGURES 1 to 4, the sheet element 101 consisting for example of sheet metal or the like forming an initially plane base surface 102, comprises first-series convex rectilinear corrugations 103 projecting from the base surface 102, second-series rectilinear concave corrugations 104 extending at right angles to the corrugations 103 of the first series, which are hollow in relation to the base surface 102, that is, projecting from the opposite side of this surface, and third-series rectilinear corrugations 105 formed in the crest of the first-series corrugations 103, substantially at their intersection with the corrugations of the second series 104 and substantially parallel thereto. The first and second series of corrugations 103 and 104 bound therebetween substantially plane and rectangular base surface portions or areas 106.

Each wave or corrugation of the aforesaid three series is of substantially dihedral configuration and preferably symmetrical to the plane normal to the base surface 102 and passing through the crest of the wave concerned. At each intersection such as 107 the corrugation 105 of the third series aforesaid consist of a single dihedral wave 105 consisting of a hollow fold following the crest 109 substantially perpendicular to the crest 110 of the wave 103 of the first series and therefore substantially parallel to the crest 111 of wave 104 of the second series and disposed in the plane of symmetry of this wave.

The solid 107 common to these three waves respectively of the aforesaid three series at each crossing of a wave of the first series 103 with a wave of the second series 104, results from the intersection of the surface portions 108a, 108b and 108'a, 108'b, of two hollow dihedrons 108, 108' with the surface of the re-entrant dihedron 105 constituting the wave of the third series.

The pair of projecting dihedrans 108, 108' are preferably substantially symmetrical on the one hand in relation to the plane of symmetry of the wave 103 of the first series and on the other hand in relation to the plane of symmetry of the wave 104 of the second series and of the wave 105 of the third series, this last-named plane thus passing through the crests 112, 112' of the two dihedrons and also through the crest 109 of the hollow dihedran 105. Thus, the two projecting dihedrons 108, 108' constitute each the transition wall providing the continuity on the one hand of the corresponding sides or faces of wave 103 of the first series and on the other hand between said wave 103 of the first series and the third-series wave 105.

It is clear that the presence of the projecting dihedrons 108, 108' is compulsory and results logically from the presence of the dihedral impression 105, notably to permit the expansion or opening movements or the contraction or closing movements of the second-series wave 104, the crests 111, 112, 109 and 112' merging successively into one another.

The specific form of embodiment illustrated in FIGURES 5 to 8 inclusive constitutes an alternate configuration substantially similar to the preceding construction and differs therefrom only by the shape of the waves of the three series, these waves having in this case a prismatic, three-faced configuration. In this example all the geometrical requirements of symmetry set forth hereinabove in connection with the first example are advantageously maintained. The single wave 105' of the third series is thus at least substantially similar and superposed to the wave 104' of the second series whereby its crests or edges are substantially parallel to those of wave 104' and located in parallel planes comprising respectively the edges of said wave 104' of the second series.

The polyhedral solid 107' common the three waves 103', 104' and 105' consists similarly of the intersection of the prismatic surface 105' constituting the third-series wave with the two lateral prismatic surfaces 113 and 113' comprising three faces and continuing the waves 103' and 104' of the first and second series while connecting the wave 104' of the second series to the wave 105' of the third series. Thus, the intersection edges of the three faces of each lateral prismatic surface 113 and 113' will provide a direct connection between the edges of the second-series wave 104' and those of the third-series wave 105'.

The prismatic or trapezoidal wave corrugations of this second example are advantageous in that they afford a greater flexibility in relation to the dihedral or triangular waves of the first example. It is desirable that all the waves whether in relief or sunk or hollow have substantially identical contours independently of the direction of their concavity or convexity.

Figure 9:
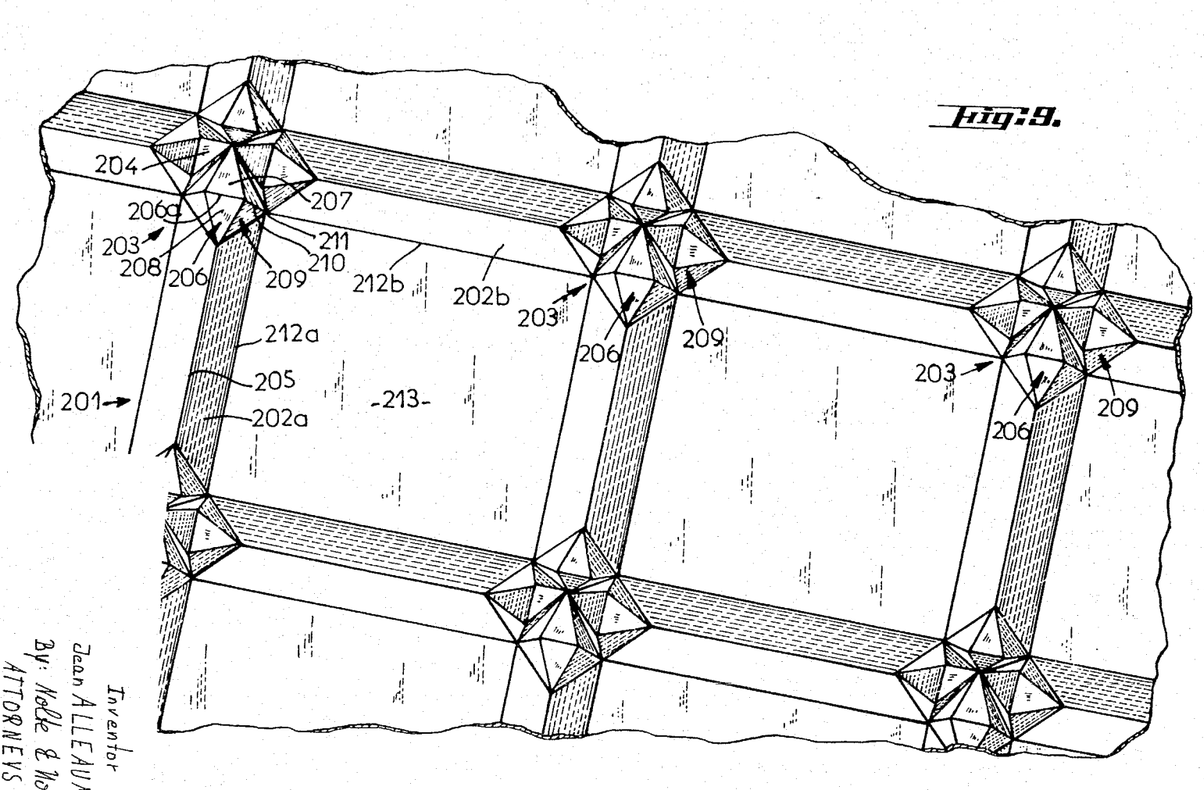
FIGURE 9 illustrates a sheet-metal element comprising two orthogonally secant series or groups of identical corrugations with intersection configurations in conformity with another form of embodiment of the present continuation-in-part.

In the alternate form of embodiment shown in FIGURE 9 the sheet-metal or like element 201 comprises two series or groups of corrugations 202a and 202b wherein all the waves have the same contour, preferably of dihedral configuration projecting symmetrically in relation to the longitudinal plane passing through the crest edge and perpendicular to the initial or basic plane of the sheet element 201. Thus, each wave 202a has the same geometrical shape and magnitude as each wave 202b and in each intersection area 203 the center of the intersection consists of a projecting pointed crest 204 and each wave 202a, 202b, in the portion of its crest edge 205 leading to said intersection area, comprises a sunk dihedral-shaped impression 206 having preferably isosceles triangular faces 207, 208 connected to said center 204 at the top of face 207 and to the crest edge 205 of the associated wave 202 at the opposite top of the other face 208.

Each impression dihedron 206 is connected by means of adequate convex folds to each lateral face of the associated wave 202 through a projecting dihedron such as 209 of which the edge 210 connects the corresponding end of the transverse edge 206a of said impression dihedron to the intersection point 211 of the edge of the concave fold 212a at the base of the associated wave 202a to the corresponding edge of the concave fold 212b at the base of the adjacent secant wave 202b. The triangular faces of each dihedron 209 are connected respectively by means of a concave fold or sunk dihedron to the corresponding lateral face of wave 202 and by means of a convex fold or a projecting dihedral to the corresponding triangular face of the impression dihedron 206.

As in the form of embodiment disclosed in the main patent application, the network of orthogonal corrugations 202a, 202b provides a series of substantially plane rectangular or square surfaces 213 and all the waves project from the same side of the initial plane of the sheet-metal element 201.

Figure 10:
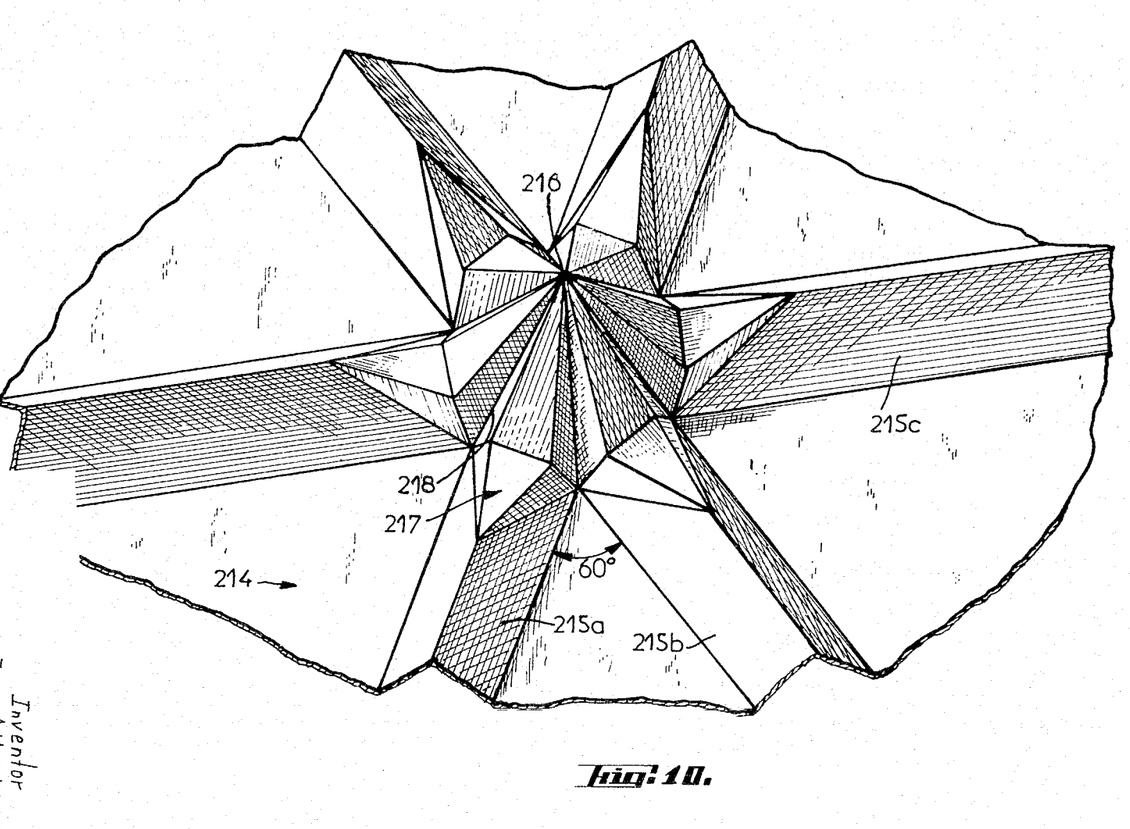
FIGURE 10 illustrates a modified form of embodiment of the wave structure shown in FIGURE 9, which comprises three series of identical waves intersecting one another at 60 degrees with intersection junction configurations according to the present continuation-in-part.

FIGURE 10 illustrates as an alternative a modified form of embodiment of the invention wherein the sheet-metal element 214 comprises three mutually secant series or groups of identical corrugations designated respectively by the reference numerals 215a, 215b and 215c, the waves of these series being disposed at spaced angular intervals about each intersection center 216 whereby the waves intersect each other at an angle of 60 degrees. Under these conditions, the flat areas thus bounded by this wave network comprising three secant series of parallel waves have a substantially triangular configuration. As a rule, these areas are polygonal and the number of their sides is equal to the number of series of secant waves.

In the example illustrated in FIGURE 10 the center of each intersection consists as in the preceding case of a projecting point-like top 216 and each wave 215a, 215b and 215c converging towards this center is connected thereto by means of a dihedral impression such as 217 formed in the crest of the associated wave. Generally, the edge or crest of each dihedral impression extends substantially at right angles to the direction of the crest edge of the associated wave and is substantially parallel to the initial plane of the sheet-metal or like element 201 or 214. Moreover, each polyhedral figure consisting of this dihedral impression, whereby each wave such as 202 or 215 leads to each intersection point such as 204 or 216, merges into the aforesaid polyhedral figure of the next or closely adjacent wave, by means of a concave fold in the form of a sunk dihedron of which the edge or crest such as 218 connects the point-like top of the intersection at the point of intersection of the crests to the base of two successive secant waves.

Figure 1:
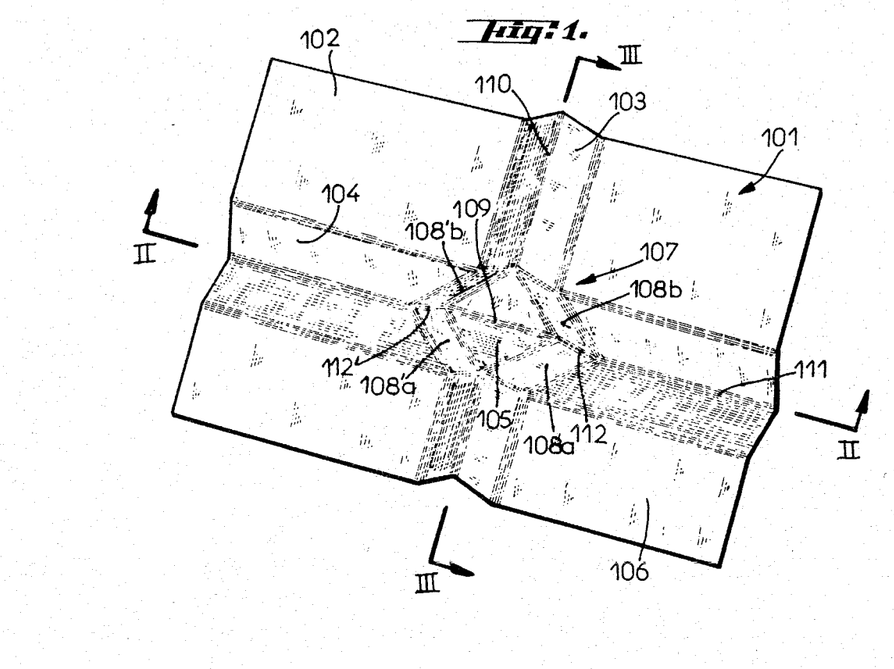
FIGURE 1 illustrates in perspective view one portion of a sheet according to one form of embodiment of the present continuation-in-part, which contains an intersection between the waves of the aforesaid three series or groups of waves, these waves having a dihedral configuration.
Figure 11:
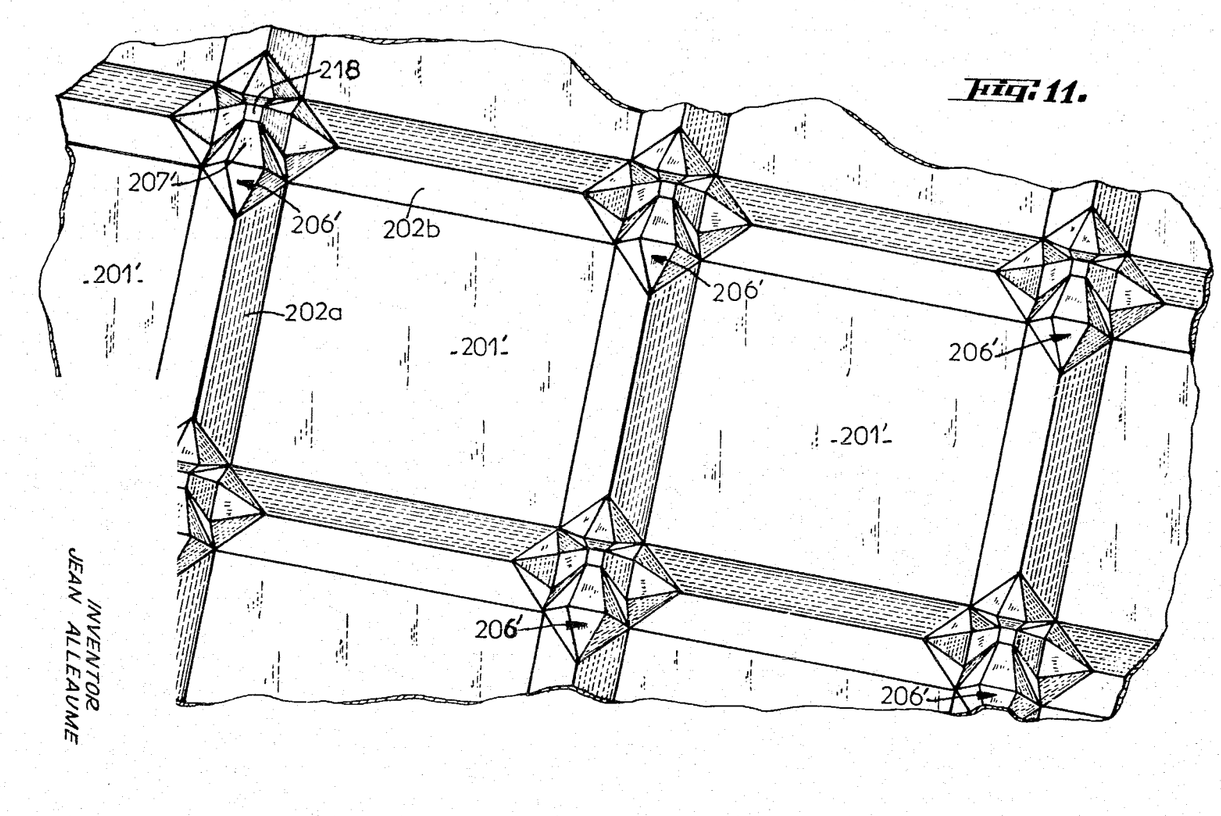
FIGURE 11 shows another modified form of embodiment of the device of FIGURE 9, with intersections having crests constituted by a polygonal surface.

FIGURE 11 illustrates the case of a corrugated sheet comprising two orthogonally secant series of parallel corrugations constituting an alternate form of embodiment illustrated in FIGURE 1. In this modified construction the center or top of each intersection consists of a regular polygonal surface 218 which may be either flat or domed, so that the face 207' connecting each impression dihedron such as 206' to this polygonal top surface be substantially trapezoidal and has for its minor base one side of this polygon 218 and for its major base the transverse edge of the impression dihedron 206'.

Figure 2:
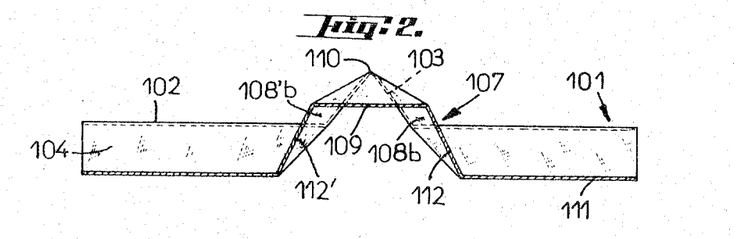
FIGURE 2 illustrates a section taken upon the line II—II of FIGURE 1, along the waves of said second and third series, across the wave of the first series.
Figure 3:
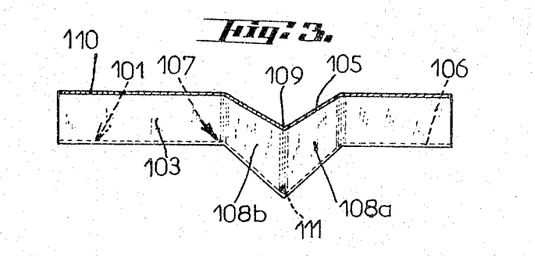
FIGURE 3 is a section taken upon the line III—III of FIGURE 1, along one wave of the first series, across the waves of said second and third series.
Figure 4:
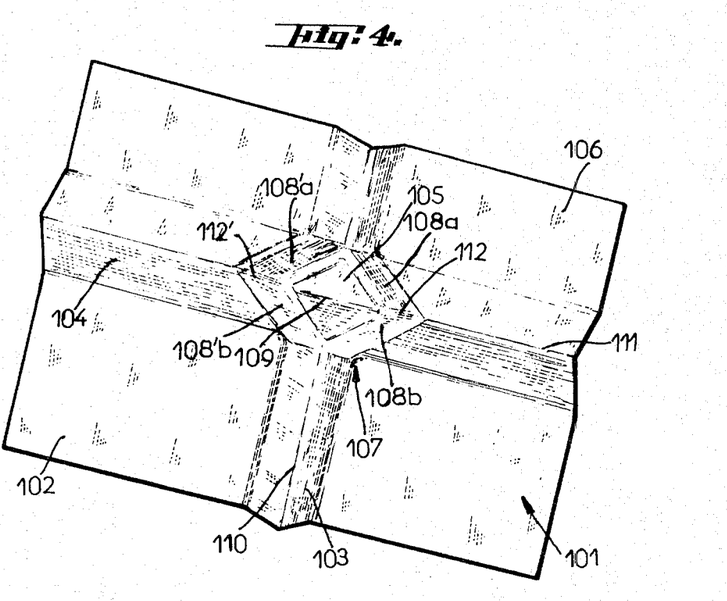
FIGURE 4 illustrates in perspective a view from the opposite or underside of the device shown in FIGURE 1.
Figure 5:
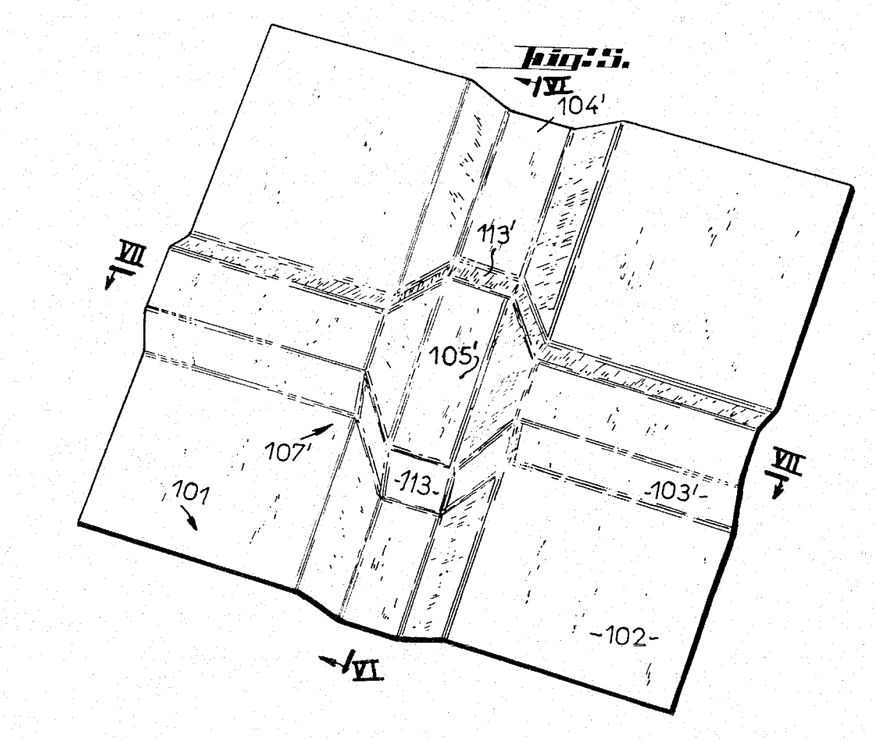
FIGURE 5 is a perspective view similar to FIGURE 1 but showing a modified form of embodiment comprising prismatic, three-faced waves.
Figure 6:
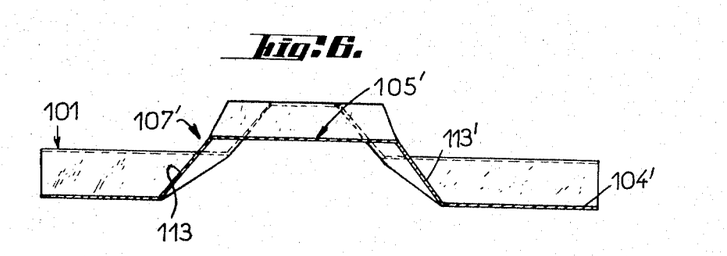
FIGURE 6 is a section similar to FIGURE 2 but taken upon the line VI—VI of FIGURE 5.
Figure 7:
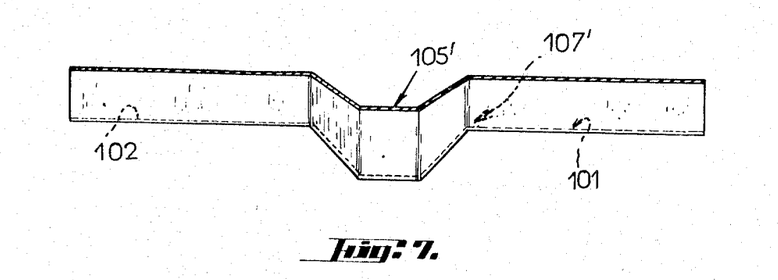
FIGURE 7 is a section similar to FIGURE 3 but taken upon the line VII—VII of FIGURE 5.

It is obvious that this regular polygonal surface constituting the top of each intersection may also be obtained with an arbitrarily great number of secant series of parallel corrugations, for example in the case illustrated in FIGURE 2 which comprises three series of corrugations.

Figures 12, 13, 14, 16:
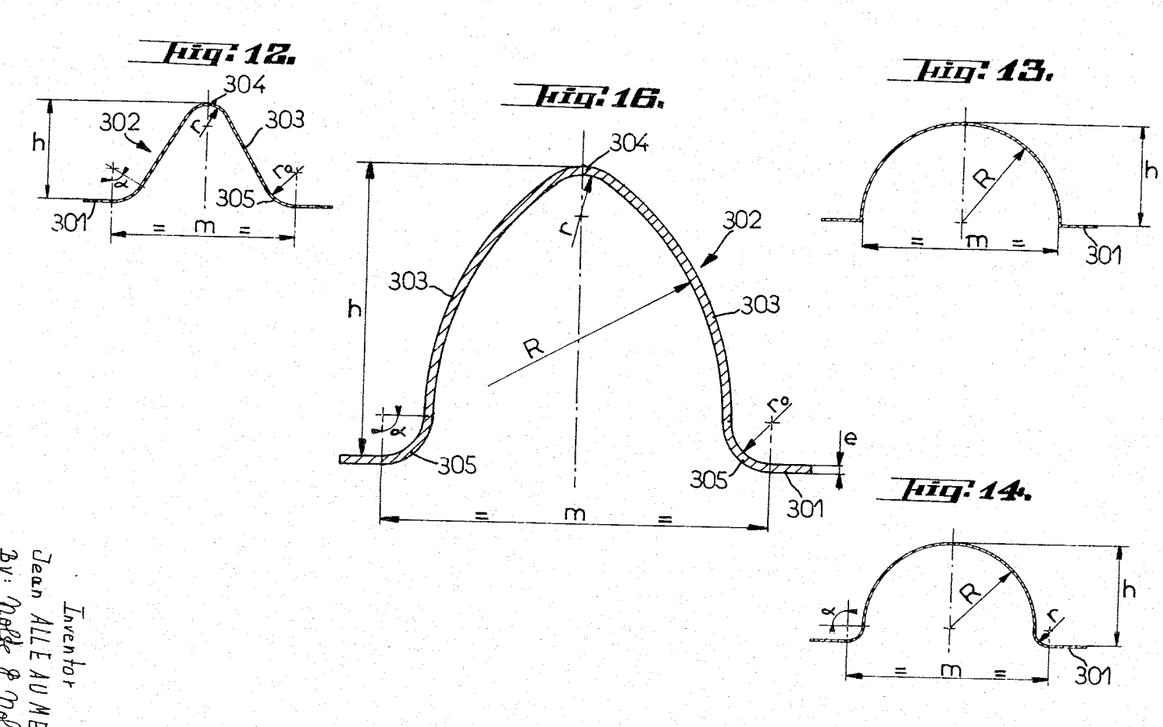
FIGURE 12 illustrates in cross-sectional view the dihedral wave form utilized up to now.
FIGURE 13 is a similar view showing a waveform having a semi-circular arcuated contour with sharp right angles at the base, this constituting the theoretically optimum shape as far as pressure strain is concerned.
FIGURE 14 illustrates in cross-section the preceding arcuated semi-circular contour in which rounded fillets have been substituted for the sharp angles at the roots.
FIGURE 16 is a similar view showing a wave form of ogival, curvilinear triangular arched configuration, with convex bulged sides, which is practically the optimum configuration under the specific service conditions contemplated.

In the alternate form of embodiment shown in FIGURE 12 the reference numeral 301 denotes one portion of the initial basic sheet-metal in which a dihedral wave 302 of a shape already described and illustrated in the main patent application has been formed. This wave comprises two sides 303 constituting flat lateral faces (and having therefore an infinitely great radius of curvature R) interconnected by a convex rounded fillet 304 constituting a circular arc of radius $r$, and to the initial base plane of the sheet 301 by concave rounded fillets 305 also constituting a circular arc of radius $r_0$. In this contour, $m$ is the opening dimension or the distance separating the beginning of the wave arcs, and $h$ is the wave height. In FIGURES 12 to 16 inclusive the same reference numerals and symbols designate the corresponding dimensional parameters of the relevant wave portions.

Figure 15:
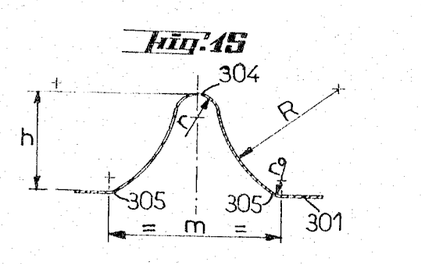
FIGURE 15 is a similar view showing a wave form having a curvilinear triangle contour with concave bulged sides.

The comparative study of stress (especially the maximum stress applied to the base of the wave) in the wave forms shown in FIGURES 12 to 16 gave the following qualitative global results, assuming that all these various wave forms have the same wave height, the same connecting fillets at the wave crest in the examples of FIGURES 12, 15 and 16, the same connecting fillets at the base in the examples of FIGURES 14 to 16, and the same wave opening ($m$) in the examples of FIGURES 13 and 14 on the one hand, and in those of FIGURES 15 and 16 on the other hand, the other dimensional parameters, although they differ somewhat, having however numeric values approximating one another.

Under these conditions it may be said that the waveform of FIGURE 13 has the highest thermal stress component, the pressure stress component being zero. In the example of FIGURE 14, the presence of connecting fillets at the base shows a pressure stress component which adds itself to the thermal stress component to give the resultant stress, but this pressure stress component is relatively lower than the pressure stress components corresponding to the wave forms of FIGURES 12, 15 and 16 (the central angle of the fillet arc at the base being rectangular $\alpha = 90°$).

For certain dimensional values the thermal stress component in the wave form of FIGURE 12 may be smaller than the heat stress components in the examples of FIGURES 13 to 16, but on the other hand the pressure stress component assumes in this case a higher value than in any one of the other examples. On the other hand it will be noted that the pressure stress term assumes a preponderant value in the aforesaid formula when the pressure values exceed a predetermined limit, and when these pressure values are below said preponderant limit it is the heat stress term that becomes preponderant. As a result, in certain specific cases wherein the pressure is below the aforesaid predetermined limit the maximum stress in the example of FIGURE 12 may be lower than that of the wave form of FIGURE 13.

The wave form of FIGURE 16 may originate a heat stress component higher than that corresponding to the wave form of FIGURE 15, but on the other hand the pressure stress component for the wave form of FIGURE 16 is then lower than the pressure stress component for the wave form of FIGURE 15, all other things being equal on the other hand.

Actually, the above qualitative comparisons are based on the comparison of coefficients A and B, so that these conclusions are adequate when the sheet-metal thickness $e$ and the applied pressure $p$ are respectively the same in all the examples contemplated herein.

Finally, under the specific service conditions contemplated, for example in the case of tanks intended for storing liquefied natural gas such as methane, which are mounted as an integral part of the hull of special tankers, the optimum wave form from the dual point of view of the strength of materials and of construction, is that shown in FIGURE 16. It appeared that the rounded fillets 305 connecting respectively the wave sides of the flat base surface 301 and extending over substantially one quadrant, that is, the circular arc constituting the fillet contour, should advantageously correspond to a rectangular central angle $\alpha = 90°$.

It is also advantageous that the rounded connecting fillets at the top (304) and base (305) of each wave have substantially the same radius of curvature, this radius having preferably the lowest value consistent with a convenient shaping of the sheet-metal by cold folding or pressing.

In the case of the form of embodiment described and illustrated in the main patent application, which comprises two series of secant waves in which the intersections of two waves pertaining respectively to these two series are orthogonal and wherein all the identical waves of a series comprise respectively, at each intersection junction thereof with the waves of the other series, which are similarly all identical to each other, and on either side of this junction, at least one transverse impression in the form of a concave fold sunk in the wave crest, the waves of the corrugation series having this impression being higher and therefore larger than the waves of the other corrugation series, the two series of corrugations projecting unilaterally from the same side of the metal sheet. In this case the dimensional parameters of a large wave having the optimum wave form shown in FIGURE 16 will advantageously have the following values:

Radius of curvature of side faces — $R=$ about 72 mm.
Common radius of curvature of rounded fillets at the top and base of wave — $r=r_0=$ about 10 mm.
Width of wave opening, measured as the relative spacing of the centers of curvature of the connecting fillets at the base — $m=$ about 94 mm.
Wave height — $h=$ about 71 mm.

In the maximum stress term (at the base of the wave) as a function of the sheet-metal thickness and of the applied pressure, the coefficients of the above relationship assume the following values:

$$A = 4.07 \text{ and } B = 3{,}460$$

considering $e$ expressed in millimeters and the pressure $p$ in kg./sq. mm.

The numerical values of the dimensional parameters of the small wave according to the optimum wave form of FIGURE 16 are governed on the one hand by the fact that the height of a waveform or contour should be such that the efforts necessary for elongating the sheet material to the same extent in the two respective orthogonal directions of the two series of corrugations are approximately the same, and on the other hand by the fact that the maximum stress should not be too high. Under these conditions, the dimensional parameters of the small wave will advantageously have the following values:

Radius of curvature of side faces — $R=$ about 48 mm.
Radius of curvature at the top and base of the wave — $r=r_0=$ about 10 mm.
Wave height — $h=$ about 48 mm.
Width of wave opening, measured as the relative spacing of the centers of curvature of the connecting fillets at the base — $m=$ about 64 mm.

In the expression giving the maximum stress at the base of the small wave, the coefficients have the following numerical values in this case:

$$A' = 8.15 \text{ and } B' = 1{,}850$$

If for a given wave contour the same similitude ratio $k$ is attributed to the various dimensional parameters, the stress in any cross-section of the wave is given by the relationship:

$$\sigma' = \frac{A.e}{k^2} + \frac{B.p.k^2}{e^2}$$

The study of the variation in this stress as a function of the thickness $e$ of the sheet metal stock and of the similitude ratio $k$ proved for example that if it is desired to exceed in these waves a stress corresponding to the elastic limit of stainless steel as meaured at room temperature (i.e.~25 kg./sq. mm.), the thickness of the sheet-metal stock to be used should be $e=2$ mm. in the case of the optimum wave form of FIGURE 16, for which value of the thickness the similitude ratio $k$, given a maximum stress of 25 kg./sq. mm., is approximately 1. On the other hand, if the sheet metal stock is 1.5 mm. thick, the above-defined optimum wave form is slightly modified; then the similitude ratio $k=$about 0.8, and the maximum stress is about 30 kg./sq. mm.

The marginal stress characterized by the force F exerted at the base of each wave in the base plane of the sheet at right angles to the longitudinal plane of symmetry of the wave is given by the following relationship as a function of the sheet-metal thickness $e$, the applied pressure $p$ and the similitude ratio $k$ of the wave contours:

$$F = \frac{0.200e3}{k^3} + 23.4p.k$$

The optimum wave shape should be selected with due consideration also for this marginal stress which must be kept of course at the minimum value. It will be noted that this last requirement, which implies the use of wave forms having the maximum flexibility and therefore the maximum slenderness, is in opposition to that imposed by the resistance to cyclic pressure which implies, on the other hand, shallower and therefore stiffer contours. Optimization calculus on which the determination of the wave forms according to this invention is based takes due account of these antagonistic conditions.

In the case contemplated herein it will be seen that the radius of curvature of each wave side is rather close to the wave height, which in turn is nearly equal to the three-fourths of the opening width at the wave base.

It will be noted that the numerical results given hereinabove have been obtained by applying the theory of beams, not that of membranes, so that the thicker the sheet metal stock, the higher the precision of the calculus utilized for obtaining these results.

What I claim is:

1. A sheet-like metal plate element having a front side and a back side and at least a portion of which is formed with a plurality of sets of at least one integral channel-like corrugation, the corrugations of each set extending in substantially parallel spaced relationship and intersecting the corrugations of any other set, each intersection of corrugations comprising one corrugation of each set extending therethrough, the corrugations of any one set being substantially congruent and of uniform cross-section throughout their lengths except in the intersecting regions and having their raised convex wave-like portions projecting all from a same side of said plate element, each corrugation being substantially symmetrical about a plane extending lengthwise of said corrugation and substantially normal to the initial sheet surface of said plate element, whereby said corrugations define therebetween substantially smooth uncorrugated polygonal areas located in said initial sheet surface; said corrugated plate element forming a substantially wholly developable geometrical surface the features of which are made by folding, each intersecting region projecting from said front side and each one of at least some of said intersecting regions being formed with at least one hollow-like depression in the shape of a substantially cylindrical recess impressed into and extending transversely of at least the crest portion of at least one corrugation also protruding from said front side, so as to provide a concave transversely widened top surface of convex contour in the crest of said last-named corrugation, in symmetrical relation to the plane of symmetry of the latter whereby the theoretical ridge line of said crest terminates adjacent to said top surface on both sides of said depression by dividing into two diverging convex boundary fold lines falling down upon spreading apart to reach the bottom of said top surface thereby gradually broadening the latter, the convex folds which correspond to said convex fold lines connecting said top surface to two lateral convex surface portions formed in and protruding sidewise in opposite directions, respectively, from either lateral face of said corrugation, thereby forming each one a lateral bulge therein, two successive depressions adjacent to two successive intersections, respectively, on a same corrugation, being connected by a continuous section of corrugation so that the length of any adjacent smooth uncorrugated area in a direction parallel to said corrugation is longer than that of any one of said depressions in said direction, said depressions at any one intersecting region defining a common intersection body interconnecting the intersecting corrugations and projecting from said front side while being hollow on said back side and formed with folds allowing deformation of said body in directions substantially parallel to any one corrugation without straining nor stressing the surface portions thereof lying between said folds.

2. A plate element according to claim 1, wherein each raised wave-like portion of each corrugation has substantially the shape of a cylindrical surface.

3. A plate element according to claim 1, wherein each wave-like portion of each corrugation has substantially the shape of a prismatic surface.

4. A plate element according to claim 1, formed with two sets of at least one corrugation, each corrugation of one set projecting from the front side of said plate element thereby forming raised wave-like convex portions thereon, whereas each corrugation of the other set projects from the back side of said plate element thereby forming hollow wave-like portions in the front side thereof, each intersecting region comprising one single depression extending substantially parallel to the hollow wave-like portion of corrugation adjacent to said intersecting region and substantially symmetrical with respect to the plane of symmetry of said hollow wave-like portion, the cross-sectional contour of said depression being at least substantially similar to that of said hollow wave-like portion so as to form itself a kind of elevated hollow wave-like portion interconnecting the substantially aligned crest portions of the raised wavelike convex portion of corrugation adjacent to said intersecting region, said depression forming the top face of a common intersection body raising from said hollow wave-like portion and bound laterally, on either side of said raised wave-like convex portion, by a convex lateral face protruding into said hollow wave-like portion.

5. A plate element according to claim 4, wherein each wave-like portion of each corrugation has substantially the shape of a prismatic surface, so that the common intersection body at each intersecting region is a polyhedron having a concave prismatic top face of polygonal contour forming said single depression, and convex lateral prismatic faces each lateral edge of which is a fold line joining one vertex of said polygonal contour to a corresponding folding line forming one lateral edge of said hollow wave-like portion, said lateral faces being connected by concave fold lines to the corresponding adjacent lateral faces of said wave-like portions.

6. A plate element according to claim 5, wherein each corrugation of one set intersects substantially at right angles each corrugation of the other set and said uncorrugated areas are substantially plane and quadrangular and said wave-like portions of the corrugations are substantially straight and in the shape of a dihedron, the single depression at each intersecting region having substantially the shape of a re-entrant dihedron as viewed from said front side with triangular lateral faces meeting along the bottom edge of said re-entrant dihedron and one vertex of which is the end of the adjacent top edge of the salient dihedron forming the adjoining raised wave-like portion, which end is connected by a concave fold line to the neighbouring vertex of an adjacent uncorrugated area, that is to the meeting point of the two fold lines bounding the corresponding lateral faces of the two intersecting corrugations at the base thereof, whereas said common intersection body is substantially symmetrical with respect to the planes of symmetry of the adjacent raised and hollow wave-like portions respectively and has each lateral surface formed by a salient dihedron with lateral faces substantially in the shape of parallelograms and the edge of which connects one end of the bottom edge of said depression to the bottom crest line of the adjacent hollow wave-like portion.

7. A plate element according to claim 5, wherein each corrugation of one set intersects substantially at right angles each corrugation of the other set and said uncorrugated areas are substantially plane and quadrangular and said wave-like portions of the corrugatinos are substantially straight and in the shape of a prismatic surface having three lateral faces of which the intermediate one is substantially parallel to said uncorrugated areas, the single depression at each intersecting region having substantially the shape of a concave prismatic surface portion of convex octagonal contour, consisting of three faces of which the intermediate one is substantially rectangular, parallel to and overlying that of the adjacent hollow wave-like portion, whereas each side face thereof is substantially trapezoidal, parallel to and overlying the corresponding side face of said hollow wave-like portion, said common intersection body being substantially symmetrical with respect to the planes of symmetry of the adjacent raised and hollow wave-like portions respectively and having each lateral surface formed by a convex prismatic surface portion with three lateral faces of which the intermediate one is substantially rectangular and each side face is a parallelogram.

8. A plate element according to claim 1, wherein all the corrugations are congruent and project from a same side of said plate element without any projection of material from the opposite side thereof and wherein each corrugation is formed, adjacent to each one of at least some intersecting regions and on either side of the latter, with one aforesaid depression, whereby the depressions, located about said intersection, define a kind of projecting hump forming at the centre of said intersection, a common intersection body having lateral faces formed by adjacent surface portions of said depressions which lateral faces are converging towards an axis passing through the centre of said intersection and substantially normal to the initial sheet surface of said plate element.

9. A plate element according to claim 8, wherein each depression has substantially the shape of a re-entrant dihedron as viewed from said front side of said plate element, the bottom edge of which is a concave fold line substantially perpendicular to the plane of symmetry of the associated corrugation and the depth of which is less than the wave height of said corrugation.

10. A plate element according to claim 9, wherein the corrugations are uniformly distributed and arranged in equally spaced relationship about each intersecting region so as to form a regular pattern, the common body of each intersection being substantially symmetrical with respect to the plane of symmetry of each adjacent corrugation, respectively.

11. A plate element according to claim 10, wherein each raised wave-like portion of each corrugation is substantially straight and in the shape of a salient dihedron as viewed from the front side of said plate element, so that each dihedral depression is bounded by convex fold lines and has at least one triangular lateral face one vertex of which is the end of the adjacent crest edge of the adjoining wave-like portion, whereas the lateral surface underneath said depression, on either side of said wave-like portion, has the shape of an overhanging salient dihedron the edge of which is a convex fold line connecting the end of the bottom edge of said depression to the neighbouring vertex of an adjoining uncorrugated polygonal area, at least one lateral face of said last-named dihedron being substantially triangular and having one vertex formed by said end of the crest edge, which end is connected to said vertex of the uncorrugated area by a concave fold line, said common body of each intersection being at least in its upper part substantially in the shape of at least a portion of a right re-entering pyramid having lateral faces formed by the respective other faces of the dihedral depressions surrounding said intersection, said other faces being connected successively to each other by intermediate re-entrant dihedral surface portions respectively each lateral face of which is formed by the other lateral face of one aforesaid overhanging salient dihedron, so that the edge of each intermediate re-entrant dihedral surface portion is a concave fold line joining the vertex of the adjoining uncorrugated area.

12. A plate element according to claim 10, wherein the pyramidal common body of said intersection terminates at its top portion in a substantially pointed vertex which is the centre of said intersection, so that each other lateral face of the dihedral depressions surrounding said intersection is substantially triangular and has its apex formed by said centre, whereas the edges of said intermediate re-entrant dihedral surface portions meet at said pointed vertex.

13. A plate element according to claim 10, wherein the pyramidal common body of said intersection has at least its upper part substantially in the shape of a frustum of a pyramid, whereby it is terminated by a substantially flat top surface of regular polygonal contour, and substantially parallel to said uncorrugated areas, so that each other lateral face of the dihedral depressions surrounding said intersection is substantially trapezoidal with its small base forming one side of said polygonal contour the vertices of which are lying on the respective edges of said intermediate re-entrant dihedral surface portions, respectively.

14. A plate element according to claim 2, wherein the surface of each wave-like portion of corrugation is convex outwards on that side of said plate element where said wave-like portion projects therefrom, said wave-like portion having a cross-sectional contour of substantially ogival arched configuration consisting of two curved sides angularly connected to each other by a rounded crest fillet and connected to the adjacent uncorrugated areas by rounded base fillets extending over substantially one quadrant, said crest and base fillets having substantially the same radius of curvature of the smallest possible value consistent with a convenient cold folding of said sheet without substantially stretching it.

15. A plate element according to claim 14, wherein the radius of curvature of each curved side is at least approximately equal to the height of said wave-like portion.

16. A plate element according to claim 15, wherein the height of said wave-like portion is substantially equal to the three-fourths of the width of the opening at the base of said wave-like portion, which opening spaces two adjacent uncorrugated areas transversely to said wave-like portion.

References Cited by the Examiner
UNITED STATES PATENTS

| | | | |
|---|---|---|---|
| 1,686,274 | 10/1928 | Greenstreet | 52—630 |
| 2,008,640 | 7/1935 | Fraser | 52—630 X |
| 2,870,981 | 1/1959 | Dellinger et al. | 52—630 X |
| 3,059,733 | 10/1962 | Hermann | 52—630 |
| 3,114,470 | 12/1963 | McDill | 287—189.36 X |
| 3,118,523 | 1/1964 | Girot | 52—573 |
| 3,184,263 | 5/1965 | Plegat | 52—630 X |

FOREIGN PATENTS 835,089   5/1950   Great Britain.

FRANK L. ABBOTT, *Primary Examiner.*

M. O. WARNECKE, *Assistant Examiner.*